June 23, 1970

V. J. ROSSOW 3,517,302

APPARATUS FOR MEASURING CONDUCTIVITY AND VELOCITY
OF PLASMA UTILIZING A PLURALITY OF SENSING COILS
POSITIONED IN THE PLASMA

Filed April 20, 1967

Fig_1

Fig_5b

Fig_5a

INVENTOR.
VERNON J. ROSSOW
BY
ATTORNEYS

— UNDISTORTED FIELD
---- DISTORTED FIELD

*Fig_2*
OSCILLATING DIPOLE IN
STATIONARY PLASMA

*Fig_3*
OSCILLATING DIPOLE WITH
PLASMA STREAM PARALLEL
TO DIPOLE AXIS

$U_{\parallel}$

$U_{\perp}$

*Fig_4*
OSCILLATING DIPOLE WITH
PLASMA STREAM PERPENDICULAR
TO DIPOLE AXIS

INVENTOR.
VERNON J. ROSSOW
BY
ATTORNEYS

Fig_8

Fig_9

Fig_10

*Fig_11a*

*Fig_11b*

*Fig_12*

United States Patent Office 3,517,302
Patented June 23, 1970

3,517,302
APPARATUS FOR MEASURING CONDUCTIVITY AND VELOCITY OF PLASMA UTILIZING A PLURALITY OF SENSING COILS POSITIONED IN THE PLASMA
Vernon J. Rossow, Los Altos, Calif., assignor to the United States of America as represented by the Administrator of the National Aeronautics and Space Administration
Filed Apr. 20, 1967, Ser. No. 634,038
Int. Cl. G01r 33/12
U.S. Cl. 324—34                         13 Claims

ABSTRACT OF THE DISCLOSURE

A system for measuring the conductivity and velocity of plasma streams employs a primary coil and several secondary coils magnetically linked thereto through the plasma. The positions of the secondary coils relative to the primary are such that they respond to distortions of the magnetic field produced by the presence of the electrically conductive fluid. The signals in the secondaries vary linearly with the conductivity and the product of conductivity times velocity.

The invention described herein was made by an employe of the United States Government and may be manufactured and used by or for the Government for governmental purposes without the payment of any royalties thereon or therefor.

SUMMARY OF THE INVENTION

This invention relates in general to systems for measuring the conductivity and velocity of plasma streams, and relates more particularly to such systems for producing signals which are a direct measure of both the conductivity and the velocity.

DESCRIPTION OF THE PRIOR ART

Numerous techniques have been employed in the past to measure the conductivity and velocity of ionized gases, such as plasma streams in wind tunnels. Some of such techniques for measuring the velocity of these gases have involved "time of flight" measurements in which particles are introduced into the stream and the time of transit of these particles from one point to another is measured. However, since the energy of the gas stream is high, the chemical reactions and the light emitted in the stream by the gas have made it impossible to make these techniques produce more than an order of magnitude estimate of the velocity.

Other proposed techniques for measuring conductivity or velocity have utilized the principle that a magnetic field is distorted by a moving plasma, or that the resistance of an electrically conducting gas dissipates energy from an oscillating magnetic field. However, in these latter techniques, because of the coil and flow field arrangements used, the measured conductivity or velocity of the plasma is the average of a bulk nature over a volume that includes a large part of the flow field, so that other means must be utilized to obtain local values for these quantities.

Additionally, the arrangements employed for the coils, coupled with the complexity of the gas dynamic flow field, make it difficult to obtain a theoretical analysis for interpreting the results. A further disadvantage of these techniques involving measuring the dissipation of an oscillating electromagnetic field is that the results are not particularly accurate because the heating of the instrument by internal electric currents and by the hot gas causes the calibration of the instrument to change with time. All of the above techniques have the further disadvantage that they require separate instruments to provide measurements of the values of the stream conductivity and velocity.

BRIEF DESCRIPTION OF THE PRESENT INVENTION

In accordance with this invention, there is provided a novel system for measuring directly and continuously the local values of the electrical conductivity and velocity of an ionized gas stream with a single instrument. This is accomplished by employing a coil system which includes a primary coil and at least two secondary coils coupled thereto through the gas stream. By special geometric arrangements of the primray coil and the secondary coils, a large electrical amplification of the signals from the secondaries is possible, thus increasing the accuracy of the measurements.

If the direction of gas stream flow is known, the present invention requires only three coils, a primary coil and two secondary coils, to produce the desired measurements. One of the secondary coils will produce an output signal which is a function of the conductivity alone, while the other secondary coil produces an output signal which is a function of the conductivity times the velocity. If the direction of gas stream flow is not known, additional secondary coils are provided, and these secondary coils provide output which are measures of the three components of the gas velocity.

OBJECTS OF THE INVENTION

It is therefore an object of this invention to provide an improved system for measuring the conductivity and velocity of an ionized gas stream.

It is a further object of the present invention to provide a system for measuring the conductivity and velocity of an ionized gas stream which provides a direct and continuous indication of the measured values.

It is an additional object of this invention to provide a system for measuring the conductivity and velocity of an ionized gas stream with accuracy and high spatial resolution.

It is a further object of this invention to provide a system for measuring the conductivity and velocity of an ionized gas stream in which a single device produces output signals which are measures of both of these quantities.

It is an additional object of the present invention to provide a system for measuring the conductivity and velocity of an ionized gas stream in which output signals are produced which vary linearly with the conductivity and with the product of the conductivity and the velocity.

BRIEF DESCRIPTION OF THE DRAWINGS

FIG. 2 is a graph of the average location of magnetic field lines of an oscillating dipole in a stationary conducting medium;

FIG. 3 is a graph showing the distortion of magnetic field lines of an oscillating dipole by a plasma stream moving parallel to the dipole axis;

FIG. 4 is a graph showing the distortion of magnetic field lines of an oscillating dipole by a plasma stream moving perpendicular to the dipole axis;

FIGS. 6a, 6b, 6c and 6d are diagrams showing coil arrangements for measuring the product of conductivity and velocity of a plasma stream;

FIG. 7 is a diagram showing a coil arrangement for measuring the conductivity and three velocity components of a plasma stream;

THEORETICAL BASIS FOR THE INVENTION

Before considering the details of the structure of the present invention, the following theoretical considerations are presented to provide a better basis for understanding its operation.

Figures 1, 5A, 5B:
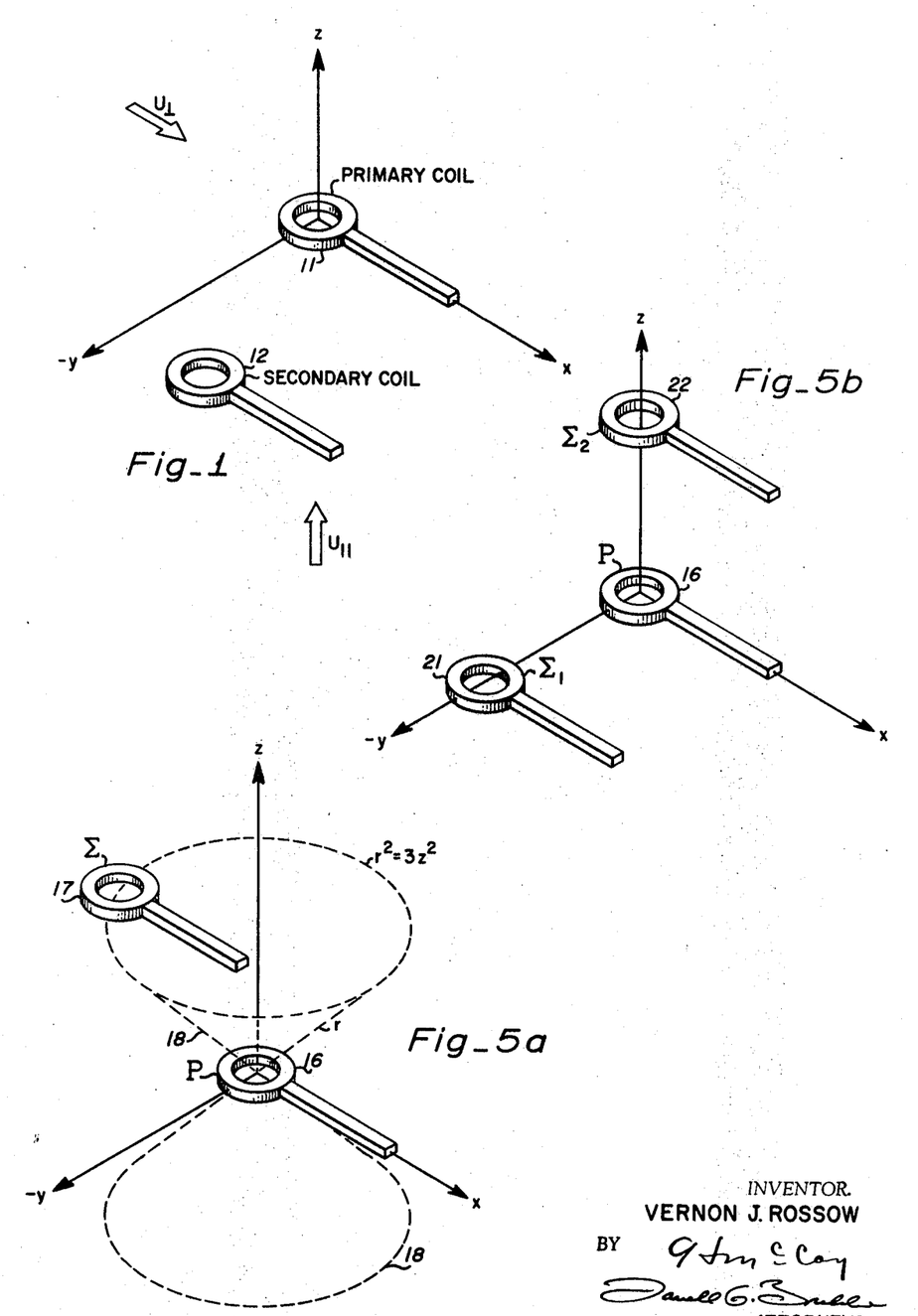
FIG. 1 is a diagram of a coil system in a plasma flow field.
FIGS. 5a and 5b are diagrams showing coil arrangements for measuring the conductivity of a plasma.

The primary coil of this invention is considered to be a magnetic dipole which is excited with alternating current of frequency $\omega/2\pi$. As shown schematically in FIG. 1, the changes in the field of a primary coil 11 brought about by the plasma, represented by the velocity vectors $$U_\perp \text{ and } U_\parallel$$

are detected by a secondary coil 12. The energy transfer across such a loosely coupled transformer depends on the manner of exciting the primary 11 and on the nature of the surrounding medium.

Most arc jet wind tunnels, where the present invention is particularly useful, operate at conditions such that the magnetic Reynolds number, $R_m$, of the stream is small.

Under these circumstances, the induced magnetic fields are small in comparison with the impressed field, because it is known that the ratio of the induced to impressed field is of the order of the magnetic Reynolds number. Hence, as a first approximation, the electric currents induced in the plasma by the interaction of a dipole magnetic field with the plasma can be calculated by assuming the dipole to be undistorted from its shape in vacuum. Then the electric currents can be calculated separately and the results summed for the total effect. Here the flow problem is divided into the three components: (1) oscillation of the dipole at frequency $\omega/2\pi$ in a stationary plasma, subscript $t$; (2) uniform flow parallel to the coil axis, $$\hat{k}U_\parallel$$

and (3) uniform flow perpendicular to the coil axis, $$\hat{i}U_\perp$$

In other words, the electric currents in the plasma for the three causes $$J_t, J_\parallel, J_\perp$$

respectively, are calculated from the undistorted or idealized magnetic dipole field, $B_p$, and the total current in the plasma is $$J = J_t + J_\parallel + J_\perp + 0(R_m^2)$$

Electric currents that generate the dipole field are not included in this equation because they are inside a coil that is assumed, in the theory, to have a vanishingly small radius. Since the disturbance or perturbation magnetic fields are related to the currents by $$\nabla \times b_t = \mu J_t, \ \nabla \times b_\parallel = \mu J_\parallel, \text{ and } \nabla \times b_\perp = \mu J_\perp$$

the total magnetic field is $$B = B_p + b_t + b_\parallel + b_\perp + 0(R_m^2)$$

Cross coupling between the perturbation fields is of second order in $R_m$ and shall be ignored here.

It is also assumed that the supports for the coils are vanishingly small in size and that the electromagnetic body forces on the plasma do not distort the parallel streamlines. In the present invention, it was found that the effect of the shock waves and flow disturbances caused by the coils and their support rods on the measurements was negligible if the coils were separated a distance large compared to their diameter. Flow distortion brought about by the magnetic field is also small because the magnetic pressure $$(\sim 10^{-6} \text{ atm.})$$

is much less than the dynamic pressure of the stream $$(\sim 0.02 \text{ atm.})$$

Hence, the flow field can be treated as a uniform stream with a constant velocity of either $$\hat{k}U_\parallel \text{ or } \hat{i}U_\perp$$

(The unit vectors $$\hat{i}, \hat{j}, \text{ and } \hat{k}$$

are directed in the positive $x$, $y$ and $z$ directions, respectively.) It is also assumed that charge neutrality exists everywhere and that no boundaries are near the dipole. Hence currents can flow in closed loops within the plasma. The plasma is taken to be uniform throughout the flow field and to have a scalar conductivity. Displacement and Hall currents and radiation are regarded as negligible so that the electric field intensity and current are alined, proportional and in phase. Since the effect of the electric field on conductivity is usually small at the intensities to be considered here, enhancement of conductivity by that effect will also be ignored. The frequency, $\omega$, is chosen so that it is much less than the plasma frequency. The foregoing idealizations make it possible to find solutions for the first-order perturbation magnetic fields by vector relationships without recourse to more complex mathematics.

OSCILLATING DIPOLE IN A STATIONARY PLASMA

Before the induced systems are found, the equations for the primary dipole field to be considered are written. The magnetic vector potential for an ideal dipole magnetic field in a medium of constant magnetic permeability $\mu$ and zero conductivity is given by $$A_p = (\mu/4\pi)m \times \nabla(1/r) \quad (1)$$

where $m$ is the magnetic dipole moment. Throughout this specification the primary coil is assumed to have its axis directed in the $+z$ or $\hat{k}$ direction and to have its center at the origin of the coordinate system. For a coil with a characteristic radius $r_p$, the magnetic dipole moment can be approximated by that given for a small coil as $$m = \hat{k}n_p \pi I_p r_p^2 \cos \omega t \equiv (4\pi m/\mu)\hat{k} \cos \omega t \quad (2)$$

where the peak electric current is $I_p$ and the number of turns in the primary coil is $n_p$. Equation 1 can then be rewritten as $$A_p = m \cos \omega t \hat{k} \times \nabla(1/r) = -m \cos \omega t \nabla \times (\hat{k}/r) \quad (3)$$

The magnetic field of the primary dipole is then given by $$B_p = \nabla \times A_p = -m \cos \omega t \nabla \times [\nabla \times (\hat{k}/r)]$$

$$= -m \cos \omega t \{\hat{i}(3xz/r^5) + \hat{j}(3yz/r^5)$$

$$+ (\hat{k}/r^3)[(3z^2/r^2) - 1]\} \quad (4)$$

where $$r = (x^2 + y^2 + z^2)^{1/2}$$

To a first order in magnetic Reynolds number, the instantaneous electric current in the plasma is given by $$\underline{J} = \sigma(\underline{E} + \underline{U} \times \underline{B}_p) \qquad (5)$$

where $\sigma$ is the conductivity.

Since the plasma is stationary for the present case, $$\underline{U} = 0$$

and the current arises only from the electric field, that is, $$\underline{J}_t = \sigma \underline{E}_t$$

where the subscript $t$ is used to denote the solution for the oscillating case. From Maxwell's equations, the electric field is, to a first order in $R_m$, $$\nabla \times \underline{E}_t = -(\partial \underline{B}_p / \partial t) = -(\partial/\partial t) \nabla \times \underline{A}_p = -\nabla \times (\partial \underline{A}_p / \partial t) \qquad (6)$$

It is then reasoned that $$\nabla \times [\underline{E}_t + (\partial \underline{A}_p / \partial t)] = 0 \text{ or}$$

$$\underline{E}_t + (\partial \underline{A}_p / \partial t) = \nabla \phi \qquad (7)$$

Since all current loops close within the fluid without crossing boundaries on which charges can accumulate, the electric field is divergence free or $$\nabla \cdot \underline{E}_t = 0$$

Also, by definition, $$\nabla \cdot \underline{A}_p = 0$$

so that $$\nabla \cdot [\underline{E}_t + (\partial \underline{A}_p / \partial t)] = 0$$

and, therefore, $$\nabla \cdot \nabla \phi = \nabla^2 \phi = 0$$

A solution that satisfies this equation for the unbounded flow field is $\phi = 0$, and so $$\underline{E}_t = -(\partial \underline{A}_p / \partial t) = -\omega m \sin \omega t \nabla \times (\hat{k}/r) \qquad (8)$$

As a result, the electric current system in the fluid and the magnetic perturbation may be related by $$\mu \underline{J}_t = \sigma \mu \underline{E}_t = \nabla \times \underline{b}_t = \sigma \mu \omega m \sin \omega t \nabla \times (\hat{k}/r) \qquad (9)$$

Equation 9 can be rewritten as $$\nabla \times [\underline{b}_t + \sigma \mu \omega m \sin \omega t (\hat{k}/r)] = 0$$

or $$\underline{b}_t + \sigma \mu \omega m (\hat{k}/r) \sin \omega t = \nabla \lambda$$

where $\lambda$ is a scaler to be determined such that $$\nabla \cdot \underline{b}_t = 0$$

When the divergences of Eq. 1 is taken, it is found that $$\nabla^2 \lambda = \sigma \mu \omega m \sin \omega t \nabla \cdot (\hat{k}/r) = \sigma \mu \omega m [\partial (1/r)/\partial z] \sin \omega t$$

since $2/r = \nabla^2 r$ and, therefore, $[\partial(1/r)/\partial z] = (1/2)\nabla^2 (\partial r/\partial z)$, the quanity, is evaluated as $$\lambda = (z/2r) \sigma \mu \omega m \sin \omega t$$

and from it, the magnetic field perturbation $b_t$ is found as $$\underline{b}_t = -\sigma \mu \omega m \sin \omega t [(\hat{k}/r) - \nabla(z/2r)] \qquad (10)$$

or in expanded form $$\underline{b}_t = -(\sigma \mu \omega m /2) \sin \omega t \{\hat{i}(xz/r^3) + \hat{j}(yz/r^3) + \hat{k}[(r^2+z^2)/r^3]\} \qquad (11)$$

Integration of the relationship $$\nabla \times \underline{a}_t = \underline{b}_t$$

by means of cylindrical coordinates yields the perturbation magnetic vector potential $\underline{a}_t$ as $$\underline{a}_t = (\sigma \mu \omega m /2) \sin \omega t [\hat{i}(y/r) - \hat{j}(x/r)] \qquad (12)$$

$$\underline{A} = \underline{A}_p + \underline{a}_t + 0(R_{mt}^2)$$

for zero flow velocity, with the magnetic Reynolds number for this case defined as $$R_{mt} = \sigma \mu \omega j^2 \qquad (13)$$

where the characteristic length has not yet been set.

If a time average or rms location of the undisturbed and the distorted magnetic lines of force are calculated using the foregoing relations for $R_{mt} = 0.4$, the nature of the influence of the conducting medium on the idealized dipole is illustrated in FIG. 2, where the undisturbed lines of force are shown in solid lines, and the distorted lines of force are shown as dashed lines.

The present invention operates by detecting the distortion of the primary field for a measurement of the conductivity. Since it is quite easy to evaluate the power dissipated in the plasma by the electric currents there, the results are presented as $$P_t = J_t^2 / \sigma \omega^2 m^2 [(x^2 + y^2)/r^6] \sin^2 \omega t / \text{unit volume} \qquad (14a)$$

and the total power dissipation for the flow field is $$P_{tot} = \iiint P_t \, dv = 8(\pi^2 \sigma \omega^2 m^2 / 3 r_0) \sin^2 \omega t \qquad (14b)$$

where $r_0$ is the radius of the nonconducting support for the primary coil.

UNIFORM STREAM PARALLEL TO DIPOLE AXIS, $U_\parallel$

As pointed out previously, the uniform stream is assumed unaltered by the presence of the coil supports or by the body force on the conducting plasma. Since only one velocity component at a time is being considered and charge separation is negligible (i.e., $\underline{E} \equiv 0$)

a first approximation to the electric current is given by $$\underline{J}_\parallel = \sigma U_\parallel \hat{k} \times \underline{B}_p \qquad (15a)$$

with $$\mu \underline{J}_\parallel = \nabla \times \underline{b}_\parallel = \sigma \mu U_\parallel \hat{k} \times (\nabla \times \underline{A}_p) \qquad (15b)$$

When the procedure used to find $b_t$ in the previous section is applied to Eqs. 15, the magnetic field perturbation brought about by a uniform stream along the dipole axis is, to a first order in $$R_{m\parallel} = \sigma \mu U_\parallel 1$$

$$\underline{b}_\parallel = \sigma \mu U_\parallel m \cos \omega t (\partial/\partial z)[(\hat{k}/r) - \nabla(z/2r)] \qquad (16a)$$

$$= (\sigma \mu U_\parallel m /2) \cos \omega t [1 - (3z^2/r^2)][\hat{i}(x/r^3) + \hat{j}(y/r^3) + \hat{k}(z/r^3)] \qquad (16b)$$

The magnetic vector potential can once again be found from the relationship $$\nabla \times \underline{a}_\parallel = \underline{b}_\parallel$$

as $$\underline{a}_\parallel = (\sigma \mu U_\parallel m \cos \omega t /2)[\hat{i}(yz/r^3) - \hat{j}(xz/r^3)] \qquad (17)$$

FIG. 3 illustrates the magnetic field lines at a given instant for an undisturbed magnetic dipole (solid lines) and the dashed lines as modified by a stream along the z axis under the conditions that $$R_{m\parallel} = \sigma \mu U_\parallel 1 = 0.4$$

UNIFORM STREAM PERPENDICULAR TO DIPOLE AXIS, U

In this case, the stream is assumed to be parallel to the $x$ coordinate and perpendicular to the dipole axis. Since the dipole field is symmetrical about the $z$ axis, the results will apply by a rotation of axes to any stream direction that lies in the $xy$ plane. The electric current is $$J_\perp = \sigma U_\perp \hat{i} \times B_p \quad (18a)$$

with now $$\mu J_\perp = \nabla \times \underline{b}_\perp \quad (18b)$$

By the same techniques employed above, $$\underline{b}_\perp = \sigma \mu U_\perp m \cos \omega t (\partial/\partial z)[(\hat{i}/r) - (\partial/\partial x)\nabla(r/2)] \quad (19a)$$

$$= -(\sigma \mu U_\perp m/2)(\cos \omega t \{(\hat{i}z/r^3)[1+(3x^2/r^2)]$$
$$+ \hat{j}(3xyz/r^5) + \hat{k}(x/r^3)[(3z^2/r^2) - 1]\} \quad (19b)$$

and $$\underline{a} = -(\sigma \mu U m/2) \cos \omega t \{\hat{j}[(x^2+y^2)/r^3] + \hat{k}(yz/r^3)\} \quad (20)$$

Distortion of the dipole field by $U_\perp$ is illustrated in FIG. 4 for $R_{m\perp} = \sigma \mu U_\perp = 0.4$, with the undistorted lines again showing in solid lines and the distorted lines of force as dashed lines.

COIL SYSTEMS

Two coil systems are shown in FIGS. 5a and 5b that will measure the conductivity without a contribution (to first order in $R_m$) arising from one or both of the velocity components $U_{||}$ or $U_\perp$. Algebraic expressions for the relationship between the voltage induced on the secondaries and the conductivity are found as follows. The potential $\Phi$ induced on a secondary anywhere in the flow field is approximated by $$\Phi = -\pi n_s r_s^2 (\partial B^s/\partial t) \quad (21)$$

where $n_s$ and $r_s$ are the number of turns and the radius of the secondary, respectively, and $B_s$ is the component of the magnetic field in a direction along the axis and at the center of the secondary. For the present invention, $B_s$ is given by $$B_s = \hat{s}[B_p + \underline{b}_t + \underline{b}_{||} + \underline{b}_\perp + 0(R_m^2)] \quad (22)$$

where it is assumed that each of the field contributions is evaluated at the center of the secondary and $\hat{s}$ is a unit vector directed along the axis of the secondary.

One embodiment for measuring the conductivity is shown in FIG. 5a. This includes a primary coil 16 and a secondary coil 17. The signal on the secondary coil 17 is found to be independent of both $$\sigma U_{||} \text{ and } \sigma U_\perp$$

because the first-order contribution in $R_m$ is zero if the primary 16 (P) and the secondary 17 ($\Sigma$) are placed so that $$\hat{s} = \hat{k} \text{ and } z^2/r^2 = 1/3$$

(see Eqs. 16b and 19b). Hence, a secondary placed anywhere on that cone (shown in outline by the dashed lines 18 in FIG. 5a will indicate only a conductivity measurement if its axis is alined with the axis of the primary. This cone represents the location in space where the z-component of the undisturbed primary field is zero. A relationship for the voltage on a coil 17 located in such a manner relative to the primary 16 is by Eqs. 11 and 21.

$$\Phi_{\Sigma a} = 2\pi r_\Sigma^2 n_\Sigma (R_{mt} \omega m/3 r_1 r_p^2) \cos \omega t \quad (23)$$

where $r_1$ is the distance to the center of the secondary coil 17 from the origin, and the characteristic length for the magnetic Reynolds number has been chosen as $r_p$, the radius of the primary coil 16. The quantities $$r_\Sigma \text{ and } n_\Sigma$$

are the radius and number of turns of the secondary coil 17.

An alternate coil system for measuring conductivity is shown in FIG. 5b. This includes the primary coil 16 and two secondary coils 21 and 22. This system is independent of $\sigma U_{||}$ but does pick up a contribution from $$\sigma U_{||} \text{ If } U_{||} = 0$$

the coil system can be analyzed as follows. Consider first the coil 21 labeled $\Sigma_1$ in FIG. 5b for which $$\hat{s}_1 = \hat{k},\ x_{\Sigma 1} = z_{\Sigma 1} = 0, \text{ and } y_{\Sigma 1} = -y_1.$$

$$B_{\Sigma 1} = (m/2)[(2 \cos \omega t/y_1^3) - R_{mt} \sin \omega t/(r_p^2 y_1)]$$

Similarly, with $$\hat{s}_2 = \hat{k},\ x_{\Sigma 2} = y_{\Sigma 2} = 0, \text{ and } z_{\Sigma 2} = z_1,$$

the field for coil 22 $\Sigma_2$ is $$B_{\Sigma 2} = -(m/2)[(4 \cos \omega t/z_1^3) + 2R_{mt} \sin \omega t/(r_p^2 z_1)]$$

If $y_1 = z_1$, and the number of turns on the coils are such that $n\Sigma_1 = 2n\Sigma_2$ and the two coils are of the same radius, the contribution of the primary field cancels when the output of the two signals are added. The other signals complement one another so that the net potential for the conductivity coils at a given instant becomes $$\Phi_{\Sigma b} = (2\pi r_\Sigma^2 n_\Sigma \omega m R_{mt}/y_1 r_p^2) \cos \omega t. \quad (24)$$

It is to be noted that although this system will work only when the stream direction is normal to the dipole axis, the sensitivity is three times greater than that of the two-coil system shown in FIG. 5a.

FIG. 6 illustrates a number of double- and triple-coil assemblies for measuring each of the products $\sigma U_{//}$ and $\sigma U_/$. In principle, the two double-coil and the two triple-coil arrangements are the same. That is, the one secondary coil in the double-coil systems measures directly the fore and aft asymmetry of the magnetic field caused by the stream. It is free from contribution by the undistorted primary field itself (by virtue of its location) and by the conductivity distortion of the primary field. The triple-coil systems require that the signals on the two secondaries be subtracted in order to eliminate the coupling associated with the conductivity and with the undistorted primary field.

Consider first the two-coil arrangement shown in FIG. 6a. This includes a primary coil 16 and one secondary coil 27. The voltage induced on the secondary is by Eqs. 16b and 21, for $$\hat{s} = \hat{j}\ x_s = z_s = 0 \text{ and } y_s = -y_1$$

$$\Phi_{Ya} = -\pi n_Y r_Y^2 (R_{m||} m\omega/2r_p y_1^2) \sin \omega t, \quad (25)$$

where $$R_{m||} = \sigma \mu U_{||} r_p$$

It is to be noted that the contributions to the potential by $$\underline{b}_t \text{ (Eq. (11)) and } \underline{b}_\perp$$

Eq. 19b are both zero.

The two-probe configuration shown in FIG. 6b includes primary coil 16 and two secondary coils 28 and 29. If the signals on the two coils 28 and 29 are subtracted, the resultant potential is again given by Eqs. 16b and 21, where now $$\hat{s}_{Y1} = \hat{s}_{Y2} = \hat{k},\ x_{Y1} = y_{Y2} = 0,\ z_{y1} = -z_{y2} = z_1$$

and $n_{Y1} = n_{Y2} = n_Y$ and $r_{Y1} = r_{Y2} = r_Y$.

$$\Phi_{Y1} = -2\pi n_Y r_Y^2 (m\omega R_{m||} \sin \omega t/r_p z_1^2) \quad (26)$$

Here, the potential induced in each secondary by the oscillation of the primary $B_p$ and the conductivity distortion $b_t$ cancel one another. The advantage of using two coils for the secondary system, as in FIG. 6b, is the greater signal strength, that is, four times larger than the one-coil arrangement of FIG. 6a if all other quantities are equal. Such a system is preferred where the measurement is marginal as a result of low values of the conductivity or for some other reason. However, the mutual aerodynamic interference between coils in the embodiment of FIG. 6b is likely to be high since the primary and the two secondaries are alined with the stream.

FIG. 6c illustrates an alternate two-coil embodiment employing primary coil 16 and a secondary coil 31 disposed as shown. FIG. 6d illustrates an alternate three-coil system utilizing primary coil 16 and two secondary coils 32 and 33. A similar treatment of the coil arrangements in FIGS. 6c and 6d by means of Eqs. 19b and 21 also yields the potentials induced in the secondaries shown there. In the first arrangement shown for $\sigma U_f$ in FIG. 6c, the pertinent quantities are $$\hat{s}=\hat{i}, \quad x_s=y_s=0$$

and $z_S = z_1$, so that $$\Phi_{Yc} = \pi n_Y r_Y^2 (m\omega R_{m\perp}/2r_p z_1^2)\sin \omega t \quad (27)$$

where $$R_{m\perp} = \sigma\mu U_\perp r_p$$

Once again, as in the embodiment shown in FIG. 6a, the primary and conductivity contributions are zero. Hence, if $$U_\perp$$

vanishes, so also does $\Phi_{Yc}$.

For the two-coil secondary arrangement of FIG. 6d, $s_1 = s = k$, $r_{Y1} = r_{Y2} = r_Y$, $n_{Y1} = n_{Y2} = n_Y$, $x_{Y1} = x_{Y2} = x_1$, and $y_Y = z_Y = 0$. Then, when the voltages induced on the two secondaries 32 and 33 are subtracted, the remaining signal is, by Eq. 19b, $$\phi_{Yd} = \pi n_Y r_Y^2(m\omega R_{m\perp}/x_1^2)\sin \omega t. \quad (28)$$

The foregoing cases illustrate the measurements that can be made with coils either directly or by cancellation of the unwanted signals. A combination of any of the coil arrangements shown in FIGS. 5 and 6 may be used to determine both the conductivity and velocity of the plasma stream. For example, as shown in FIG. 7, with a single primary and as few as four secondaries, the conductivity and three velocity components of an ionized gas stream can be measured. In FIG. 7, primary 16 and secondary coils 17, 27 and 31 are provided, as well as an additional secondary coil 34, for measuring the velocity component $U_y$. As indicated by the labels on the secondary coils, this arrangement is effective to measure the conductivity (coil 17) and the three velocity components (coils 27, 31 and 34). In the special case where the flow direction is known, the coil arrangement can be further simplified by having only one velocity coil and one conductivity coil.

PREFERRED EMBODIMENT OF THE INVENTION

Figure 8:
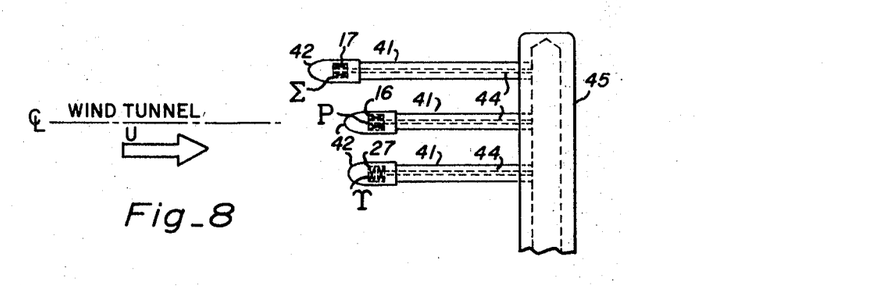
FIG. 8 is a side view of a three-coil arrangement for measuring conductivity and velocity of a plasma stream in a constricted wind tunnel.

Several models of the probe system were built, calibrated and tested in a constricted wind tunnel to determine the practicability of the coil arrangements. The configuration chosen for the tests was deemed to be most suitable for the plasma stream. Since the stream is nearly unidirectional ($\mu_x \approx \mu_y \approx 0$) (as before, the primary coil has its axis in the $+z$ direction), a three-coil configuration as shown in FIG. 8 was used. This configuration is actually a combination of the models shown in FIGS. 5a and 6a, and includes the primary coil 16, the secondary coil 17 and the secondary coil 27. To provide structural rigidity and yet resist heat exposure, ceramic support rods 41 were used for the primary structure, with a suitable heat shield material 42 at the end of each support rod. In this way, an initial alinement of coils and the zero reading on the oscilloscope in the absence of a plasma can be maintained during the tests. Any small relative movement of the coils is apparent in the signal at the amplifications used.

Each support rod 41 was provided with a passageway therein, represented by the dotted lines 44, for the shielded cable from the coils. All of the support rods 41 were mounted on a main support member 45.

To determine the effect of probe size and spacing, three sizes of the three-coil probes were investigated. Configurations I and II had the same 22-mm. coil spacing, but their coil (and support rod) diameters were 6.4 mm. and 2.0 mm., respectively. Configuration III consisted of coils 2.0 mm. in diameter with 8 mm. spacing so that the overall probe height was about 18 mm. Probes II and III had the same frontal area in order to assess the change in performance caused by probe spacing.

Figure 9:
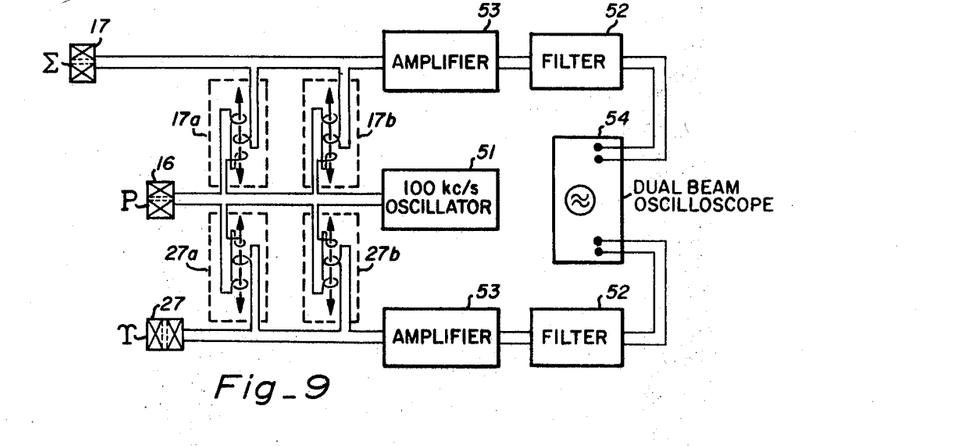
FIG. 9 is a schematic diagram of the circuit used with the arrangement of FIG. 8.

Elements of the circuit used are illustrated in FIG. 9. Two auxiliary or tickler coils are used to adjust the zero reading on each secondary to balance out any residual electromagnetic or electrostatic signal that may remain after the coils are mechanically alined or that may arise due to drift of the electrical equipment while the probe is inside the wind tunnel. In this way, the signal amplitude, when the probe is in room air, can be reduced to a low value to yield a good null that is essential for accurate calibration.

These auxiliary coils include a pair of coils 17a, 17b associated with secondary coil 17, and coils 27a, 27b associated with secondary coil 27. Each tickler coil consists of one turn from the lead to the associated secondary coil and two turns from the primary coil 16. As indicated in FIG. 9, the auxiliary coils are wound in opposition and the coupling is aided by either a brass or ferrite core. Two turns of opposite polarity with the third turn between are used for obtaining a positive or negative perturbation. The brass core shifts the phase and the ferrite core changes the amplitude.

The frequency of the oscillator 51 (100 kc./s.) used to supply the primary current ($\sim$0.1 amp) is crystal controlled and the amplitude is Zener diode controlled. Magnetostrictive filters 52 with a $\pm 15$ cycle/s bandpass reduce noise from the amplifier 53 and plasma stream. A dual-beam oscilloscope 54 with a maximum sensitivity of $10\mu$ v./cm. and a polaroid camera provide means for read-out and recording of the data. Since the amplifier of FIG. 9 has an amplification ratio of about 5, the overall sensitivity of the circuit is approximately $2\mu$ v./cm. An LC filter was also installed in the oscilloscope to reduce its internal noise. The response time of the circuit is estimated at about 0.03 second. All of the leads, the secondary coils, metal supports, etc., are shielded and insulated against electrostatic coupling with the primary coil and the plasma stream.

Calibration

Calibration of the apparatus shown in FIG. 9 consisted of two parts. Tests were first conducted to determine how well the theory represents the physical situation under consideration, and to find the proper corrections for the deviations. Next, scale factors were found for the various probe systems in order to relate the measured voltages to the conductivity and velocity of the plasma stream. Since the properties of the plasma stream were uncertain, the calibration was carried out in salt (NaCl) water and in sulphuric acid. Measurements made with a conductivity cell agreed with handbook values.

It was assumed in the foregoing theory that there were no boundaries to disturb the electromagnetic field of the primary coil. In reality, the presence of the support rods and heat shields for the primary and secondary coils together with the finite size of the electrically conducting medium did eliminate some of the electric currents assumed to exist in the theory. Another possible cause for deviation, although found to be negligible to the accuracy of the present invention, was the representation of a coil of finite size by a dipole.

Figure 10:
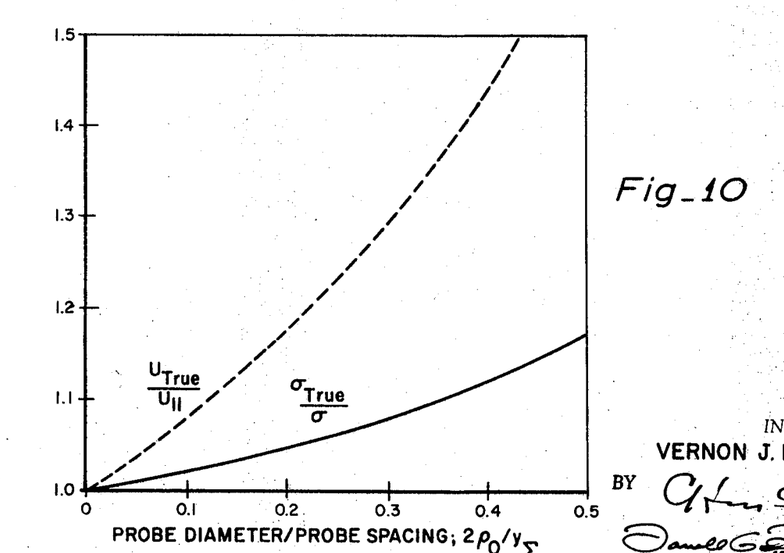
FIG. 10 is a graph showing the factors for velocity and conductivity to correct for the presence of coil support rods and heat shields.

A theoretical estimate for the loss in magnetic field brought about by the finite size of the heat shield and coil support rod of the primary coil is obtained by numerical evaluation of the relationship $$b_{corr} = \frac{\nabla x}{4\pi} \int_{-\infty}^{z_{cyl}} \int_0^{2\pi} \int_0^{\rho_0} \frac{\mu^J \rho_1 d\rho_1 d\phi_1 dz_1}{[\rho_1^2 - 2\rho_s\rho_1 \cos \phi_1 + \rho_s^2 + (z_s - z_1)^2]^{1/2}} \quad (29)$$

where $J$ is given by Eq. 8 for the conductivity correction and by Eq. 15b for the velocity, and $\rho_0$ is the maximum radius of the heat shield. It is assumed that the secondary coil is located at $\rho = \rho_s$, $\phi = 0$, $z = z_s$ and that the heat-shield support-rod combination can be represented by a semi-infinite cylinder of radius $\rho_0$ that extends ahead of the coil center by $z_{cyl}$. Results for the conductivity and for $U_{||}$ are shown in dimensionless form in FIG. 10 for a value of $z_{cyl}$ large enough to include any measurable signal loss (and therefore assure symmetry about $z=0$).

Figure 11A:
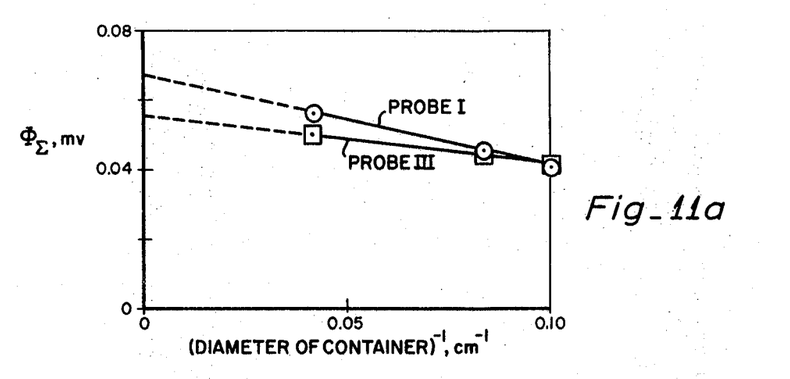
FIG. 11a is a graph showing variations of the secondary voltage of a given probe with the diameter of the container used for calibration.
Figure 11B:
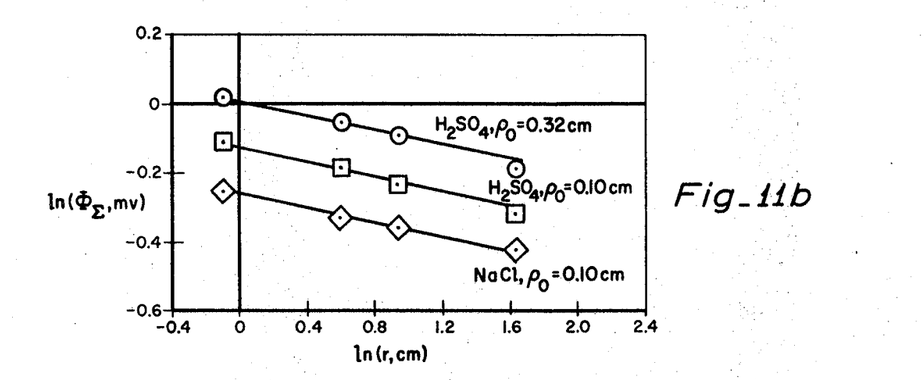
FIG. 11b is a graph showing variations of the secondary voltage of the same probe when corrected to infinite stream size and zero probe support diameter.

Loss of signal caused by the finite size of the test medium was not found by Eq. 29 because of the slow convergence with $\rho$ for some of the integrals. However, values of $$\Phi_\Sigma$$

were obtained experimentally with salt water and acid in containers with diameters of 10 cm., 15 cm., and 25 cm. Depth of the fluids (15–30 cm.) was always sufficient to insure no measurable effect. These results, shown in FIG. 11a, form a straight line when plotted as a function of the inverse of the container diameter, and thereby permit easy extrapolation to infinite container size. When these results are used to correct the measured conductivity signals for finite probe and stream size, the voltage induced on the conductivity secondary, $$\Phi_\Sigma$$

is found to vary linearly with $$y_\Sigma^{-1}$$

as shown in FIG. 11b, and as predicted by Eq. 23.

Figure 12:
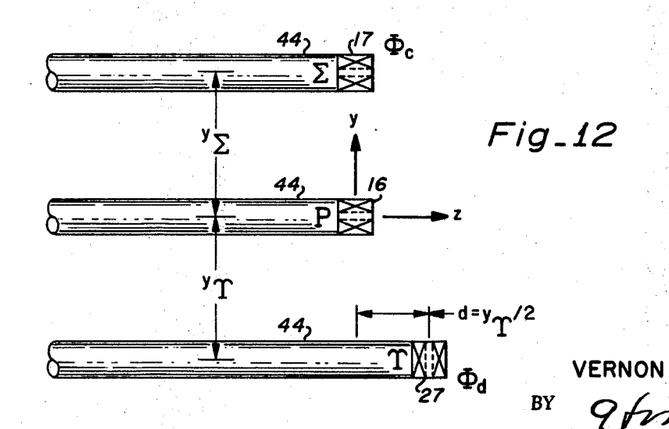
FIG. 12 is a diagram showing the coil positions used to evaluate the product of area and turns of the coils and the amplification of the circuit in calibrating the system.

Theoretical values for $$\Phi_\Sigma$$

can be calculated by Eq. 23 provided effective values are established for the coil areas, together with the amplification or attenuation in each part of the electrical circuit. However, quantitative data for the separate stages are difficult to determine accurately in some cases and the accumulated error for the total might be sizable. A more satisfactory technique for an overall constant that includes area and amplification is illustrated in FIG. 12 and may be obtained as follows. The signal on the $\Sigma$ secondary is first measured when it is retracted in the $z$ direction to $z=0$ as shown in FIG. 12, so that the primary and $\Sigma$ coils are both at the same streamwise station. Then, from Eqs. 4 and 21 the voltage (peak to peak) induced on the $\Sigma$ probe at $z=0$ is, in the absence of a conducting medium, $$\Phi_C = 2\pi m n_\Sigma r_\Sigma^2 \omega / y_\Sigma^3 \quad (30)$$

Unknowns regarding the (effective number of turns) x (radius) of the primary and $\Sigma$ coils together with the amplification ratio of the electronics are then eliminated in order to determine the calibration constant, $$\sigma/\Phi_\Sigma$$

That is, by considering the ratio of the peak-to-peak voltages of $$\Phi_C \text{ to } \Phi_\Sigma$$

as given by Eqs. 30 and 23, $$\frac{\sigma}{\Phi_\Sigma} = \frac{2(y_\Sigma^2 + z_\Sigma^2)^{1/2}}{\mu \omega y_\Sigma^3 \Phi_C [1 + z_\Sigma^2/(y_\Sigma^2 + z_\Sigma^2)]} = \frac{3\sqrt{6}}{4\mu \omega y_\Sigma^2 \Phi} \quad (31)$$

since $$3z_\Sigma^2 = y_\Sigma^2 + z_\Sigma^2$$

By this means, the theoretical calibration constants for probes I and III are, respectively, $$\sigma/\Phi_\Sigma) \text{ theo} = 221 \text{ and } 610 \text{ mhos./m./mv.}$$

for a stream of infinite diameter and corrected (FIG. 10) to the finite probe size being used. The corresponding experimental values found by dipping the probes in conducting solutions are $$\sigma/\Phi_\Sigma)_{exp} = 209 \text{ and } 613 \text{ mhos./m./mv.}$$

An evaluation of the (effective area) × (turns of the velocity coil) for the velocity coil 27 is found in a manner similar to that used for the $\Sigma$ coil 17. From Eqs. 23 and 25, the velocity of the plasma is given by the ratio of the peak-to-peak signals measured on the $\Sigma$ and $Y$ coils as $$U_{||} = (\Phi_Y/\Phi_\Sigma)(r_\Sigma^2 n_\Sigma/r_Y^2 n_Y)(\sqrt{2}\, 4\omega y_Y^2/3\sqrt{3}y_\Sigma) \quad (32)$$

where $y\Sigma = y_Y$ in present tests. In Eq. 32 it is assumed that both circuits amplify the measured voltages by the same amount and that the correction for the plasma volume (and the associated electric currents) displaced by the coils, and their support rods and the finite size of the stream are the same. As before, the amplifier calibration constant is included with the turns ratio. When the coils are located as shown in FIG. 12, the signals on both are a maximum as a function of $z$; that is, $$(d\Phi_Y/dz)_{z=d} = 0$$

where $$d = y_Y/2.$$

In practice, the coils are moved in the $z$ direction by sliding the support rods 41 through the main support 45 (FIG. 8) until each has achieved its maximum voltage with room air as the surrounding medium. The theoretical ratio of the peak-to-peak voltages on the coils is then, from Eqs. 4 and 21, $$\Phi_c/\Phi_d = 5^{5/2} d^3 r_\Sigma^2 n_\Sigma / 6 y_\Sigma^3 r_Y^2 n_Y$$

since $y_Y = 2d$. If, as for the present probes, $$y_\Sigma = y_Y$$

the calibration constant that accounts for the effective area turns and amplification ratio is $$r_\Sigma^2 n_\Sigma / r_Y^2 n_Y = (\Phi_c/\Phi_d)[48/(25\sqrt{5})] = 0.8586(\Phi_c/\Phi_d) \quad (33)$$

where $\Phi_c$ and $\Phi_d$ are read from the oscilloscope.

When Eqs. 15b and 29 are used to evaluate the effect of the probe support rod and heat shield on the velocity signal as compared with the amount for the conductivity, the correction factor found is shown as the dashed line in FIG. 10.

From these considerations, the calibration constants for the velocity probes in an infinite medium and with finite support-rod diameters are $$U_{||} = 6{,}100 \ \Phi_Y/\Phi_\Sigma, \ 14{,}600 \ \Phi_Y/\Phi_\Sigma, \text{ and } 3{,}300$$

$$\phi_Y/\phi_\Sigma m/s$$

respectively, for probes I, II, and III.

Test results

Plasma flowing in a constricted-arc wind tunnel was generated at power levels from 100 to 400 amp current through a 1.27 cm. (½ in.) throat constrictor. Each of the probes was mounted on an air-driven carriage that would traverse the 15 cm. free jet horizontally over a distance of about 22 cm. in as little as 0.3 second. The primary coil was located such that it passed through the wind-tunnel center line and was at no time within 10 cm. of any metal object of the facility; this distance was found to be sufficient to prevent an observable extraneous signal.

Motion of the carriage was coupled to the sweep of the two beams of the oscilloscope 54 by a potentiometer so that a 2.5 cm. movement of the probe resulted in approximately 1 cm. (or 1 division) movement of the beams. A number of runs were made to determine the repeatability of each instrument and of the facility and to determine the effect of sweep direction, heat-shield shape, and coil size and spacing on the data. Repeatability in the gross aspects of the data for given tunnel conditions was found to be good.

Both the velocity and conductivity were found to be independent of the heat-shield shape and probe spacing if the volume corrections in FIG. 10 were applied. These tests included heat-shield tips that were approximately hemispherical and that had 5° to 40° semivertex conical tips. Results from the various probes tested agreed with each other within the repeatability of the test facility. The lowest measurable values of conductivity appear to be about 1 mho/m. for the largest probe, I, and about 10 mhos/m. for the smaller ones. The threshold velocity depends on the conductivity of the stream. For the tests discussed here, it was about 200 m./s. The magnetic Reynolds numbers of the tests carried out varied from $R_m = 0.0001$ to $0.1$.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. Apparatus for measuring the conductivity of an ionized gas stream, comprising:
    a primary electrical coil disposed in said gas stream, the center of said primary coil lying at the origin of a cartesian coordinate system with a first coordinate axis coincident with the central axis of said coil;
    means for supplying electrical energy to said primary coil;
    a secondary electrical coil disposed in said gas stream and magnetically coupled to said primary coil through said stream, the axis of said secondary coil being parallel with the axis of said primary coil;
    said secondary coil being spaced from said primary coil in accordance with the relationship $$[r^2 = 3z^2]r^2 = 3z^2$$

where $r$ is the distance from the center of said primary coil to the center of said secondary coil and $z$ is the distance said secondary coil is spaced from said primary coil in a direction parallel to the central axis of said coils; and
    indicating means connected to said secondary coil and responsive to the voltage thereacross for producing an indication of the conductivity of the gas stream.

2. Apparatus for measuring the conductivity of an ionized gas stream, comprising:
    a primary electrical coil disposed in said gas stream, the center of said primary coil lying at the origin of a cartesian coordinate system with a first coordinate axis coincident with the central axis of said coil;
    means for supplying electrical energy to said primary coil;
    first and second secondary coils disposed in said gas stream and magnetically coupled to said primary coil through said stream, said first secondary coil being spaced from said primary coil and having its central axis coincident with said first coordinate axis;
    said second secondary coil being spaced from said primary coil and having its central axis spaced from but parallel to said first coordinate axis; and
    indicating means connected to said first and second secondary coils and responsive to the combined voltage thereacross for producing an indication of the conductivity of the gas stream.

3. Apparatus in accordance with claim 2 in which said second secondary coil is spaced from said primary coil on a second coordinate axis which is normal to said first coordinate axis.

4. Apparatus for measuring the conductivity and velocity of an ionized gas stream, comprising:
    a primary electrical coil disposed in said gas stream, the center of said primary coil lying at the origin of a cartesian coordinate system with a first coordinate axis coincident with the central axis of said coil;
    means for supplying electrical energy to said primary coil;
    first and second secondary coils disposed in said gas stream and magnetically coupled to said primary coil through said gas stream;
    said first secondary coil being spaced from said primary coil in accordance with the relationship $r^2 = 3z^2$ where $r$ is the distance from the center of said primary coil to the center of said first secondary coil $z$ is the distance said first secondary coil is spaced from said primary coil in a direction parallel to the central axis of said coils;
    said second secondary coil being spaced from said primary coil on a second coordinate axis which is normal to said first coordinate axis;
    first indicating means connected to said first secondary coil and responsive to the voltage thereacross for producing an indication of the conductivity of said gas stream; and
    second indicating means connected to said second secondary coil and responsive to the voltage thereacross for producing an indication of the product of the conductivity and the velocity of the gas stream.

5. Apparatus in accordance with claim 4 in which the central axis of said second secondary coil coincides with said second coordinate axis.

6. Apparatus in accordance with claim 5 comprising means for generating and directing plasma gas in a direction parallel to said first coordinate axis.

7. Apparatus for measuring the conductivity and velocity of an ionized gas stream, comprising:
    a primary electrical coil disposed in said gas stream, the center of said primary coil lying at the origin of a cartesian coordinate system with a first coordinate axis coincident with the central axis of said coil;
    means for supplying electrical energy to said primary coil;
    first, second, third and fourth secondary coils disposed in said gas stream and magnetically coupled to said primary coil through said gas stream;
    said first secondary coil being spaced from said primary coil in accordance with the relationship $r^2 = 3z^2$ where $r$ is the distance from the center of said primary coil to the center of said first secondary coil and $z$ is the distance said first secondary coil is spaced from said primary coil in a direction parallel to the central axis of said coils;
    said second and said third secondary coils being spaced from said primary coil on said first coordinate axis;
    said fourth secondary coil being spaced from said primary coil on a second coordinate axis which is normal to said first coordinate axis;
    first indicating means connected to said first secondary coil and responsive to the voltage thereacross for producing an indication of the conductivity of said gas stream; and second indicating means connected to said second, third and fourth secondary coils and responsive to the voltages thereacross for producing an indication of the velocity components of said gas stream.

8. Apparatus in accordance with claim 7 in which the central axes of said second and said third secondary coils are disposed normal to said first coordinate axis.

9. Apparatus in accordance with claim 8 in which the central axes of said second and said third secondary coils are disposed normal to each other.

10. Apparatus in accordance with claim 9 in which the central axis of said fourth secondary coil is disposed parallel to the central axis of said third secondary coil.

11. Apparatus for measuring the conductivity and velocity of an ionized gas stream, comprising:
a primary electrical coil disposed in said gas stream, the center of said primary coil lying at the origin of a cartesian coordinate system with a first coordinate axis coincident with the central axis of said coil;
means for supplying electrical energy to said primary coil;
first and second secondary coils disposed in said gas stream and magnetically coupled to said primary coil through said gas stream;
the central axes of said first and second secondary coils being parallel to the central axis of said primary coil, said primary and secondary coils being individually shielded from said gas stream thereby permitting the gas stream to flow around and between said coils; and
indicating means connected to said first and second secondary coils and responsive to the combined voltage thereacross for producing an indication of the product of the conductivity and the velocity of the gas stream.

12. Apparatus in accordance with claim 11 in which said first and second secondary coils have their central axes coincident with said first coordinate axis and are spaced from each other on opposite sides of said primary coil.

13. Apparatus in accordance with claim 11 in which said first and second secondary coils lie along a second coordinate axis normal to said first coordinate axis.

References Cited

UNITED STATES PATENTS

| 2,435,043 | 1/1948  | Lehde et al. |
|-----------|---------|--------------|
| 2,608,860 | 9/1952  | Ramey et al. |
| 3,249,869 | 5/1966  | Meyer et al. |
| 3,262,052 | 7/1966  | Fuhs.        |
| 3,292,079 | 12/1966 | Schindler __________ 324—40 |

FOREIGN PATENTS

| 169,816   | 11/1965 | U.S.S.R.      |
| 1,023,026 | 3/1966  | Great Britain.|
| 1,157,500 | 3/1958  | France.       |
| 1,307,213 | 9/1962  | France.       |

GERARD R. STRECKER, Primary Examiner

R. J. CORCORAN, Assistant Examiner

U.S. Cl. X.R.

73—194; 324—30, 40

UNITED STATES PATENT OFFICE
Certificate of Correction

Patent No. 3,517,302            Vernon J. Rossow          June 23, 1970

It is certified that error appears in the above identified patent and that said Letters Patent are hereby corrected as shown below.

Column 2, line 16, "primray" should read —primary—. Column 3, line 64, "$B_p$" should read —$B_p$—. Column 4, Equation (1) should appear as $A_p = (\mu/4\pi) m X^\triangledown (1/r)$; line 54, "$m$" should read —$m$—.

Column 5, line 30, change "$\nabla \cdot A_p = 0$" to read —$\nabla \cdot A_p = 0$—; Equation (9), should appear as shown below:

$$-\mu J_t = \sigma\mu E_t = \nabla \times b_t = -\sigma\mu\omega m \sin \omega t \nabla \times (\hat{k}/r) -$$

line 54, "scaler" should read —scalar—; line 56, "divergences" should read —divergence—; line 61, "quanity" should read —quantity $\lambda$—; line 65, "$b_t$" should read —$b_t$—.

Column 6, Equation (12) "$a_t = (\sigma\mu\omega m/2) \sin \omega t [\hat{i}(y/r) - \hat{j}(x/r)]$" should read —$a_t = (\sigma\mu\omega m/2) \sin \omega t [\hat{i}(y/r) - \hat{j}(x/r)]$—; line 7, after first part of Equation (12) insert —where—; same column 6, line 8, "$A = A_p + a_t + 0(R_{mt}^2)$" should read —$A = A_p + a_t + 0(R^2{}_{mt})$—; Equation (13), change "$R_{mt} = \sigma\mu\omega j^2$" to —$R_{mt} = \sigma\mu\omega l^2$—. Equation (14a) should appear as shown below:

$$-P_t = J_t^2/\sigma = \sigma\omega^2 m^2 [(x^2+y^2)/r^6] \sin^2/\text{unit volume}-;$$

Equation (15b), should appear as $$\mu J_{||} = \nabla \times b_{||} = \sigma\mu U_{||} \hat{k} \times (\nabla \times A_p);$$

line 52, "$b_t$" should read —$b_t$—; line 56, "$R_{m||} = \sigma\mu U_{||}1$" should read —$R_{m||} = \sigma\mu U_{||}l$—; line 75, "$R_{m||} = \sigma\mu U_{||} = 0.4$" should read —$R_{m||} = \sigma\mu U_{||}l = 0.4$—.

Column 7, line 2, "AXIS, U" should read —AXIS, $U_\perp$—; Equation (19a) change "$b_\perp = \sigma\mu U_\perp m \cos \omega t (\partial/\partial z)[(\hat{i}/r) - (\partial/\partial x) \nabla (r/2)]$" to —$b_\perp = \sigma\mu U_\perp m \cos \omega t (\partial/\partial z)[(\hat{i}/r) - (\partial/\partial x) \nabla (r/2)]$—; Equation (20), should appear as shown below:

$$a_\perp = -(\sigma\mu U_\perp m/2) \cos \omega t \{\hat{j}[(x^2+y^2)/r^3] + \hat{k}(yz/r^3)\}$$

line 25, change "$R_{m\perp} = \sigma\mu \dot{U}_\perp = 0.4$" to —$R_{m\perp} = \sigma\mu U_\perp l = 0.4$—; same column 7, Equation (21), should appear as $\Phi = -\pi n_s r_s^2 (\partial B_s/\partial t)$.

Column 8, line 9, change "$\sigma U_|$" to —$\sigma U_\perp$—; line 11, change "$\sigma U_{||}$ If $U_{||} = 0$" to —$\sigma U_{||}$. If $U_{||} = 0$—; line 25, change "$n\Sigma_1 = 2n\Sigma_2$" to —$n_{\Sigma 1} = 2n_{\Sigma 2}$—; line 54, change "$\hat{s} = \hat{j} x_s = z_s = 0$ and $y_s = -y_1$" to —$\hat{s} = \hat{j}$, $x_s = z_s = 0$, and $y_s = -y_1$—; line 75, change "$B_p$" to —$B_p$—.

Column 9, line 1, change "$b_t$" to —$b_t$—; line 18, change "$\sigma U_|$" to —$\sigma U_\perp$—; Equation (27), change "$\Phi_{Yc} = \pi n_Y r_Y^2 (m\omega R_m/2r_p z_1^2) \sin \omega t$" to —$\Phi_{Yc} = \pi n_Y r_Y^2 (m\omega R_{m\perp}/2r_p z_1^2) \sin \omega t$—; same column 9, line 34, change "$s_1 = s = k$, $r_{Y1} = r_{Y2} = r_Y$, $n_{Y1} = n_{Y2} = n_Y$, $x_{Y1} = x_{Y2} = x_1$, and" to —$\hat{s}_1 = \hat{s} = \hat{k}$, $r_{Y1} = r_{Y2} = r_Y$, $n_{Y1} = n_{Y2} = n_Y$, $x_{Y1} = -x_{Y2} = x_1$, and—.

Column 11, Equation (29), change $$b_{\text{corr}} = \frac{\nabla x}{4\pi} \int_{-\infty}^{z_{cr1}} \int_0^{2\pi} \int_0^{\rho 0} \frac{\mu J \rho_1 d\rho_1 d\phi_1 dz_1}{[\rho_1^2 - 2\rho_s \rho_1 \cos \phi_1 + \rho_s^2 + (z_s - z_1)^2]^{1/2}}$$

to $$b_{\text{corr}} = \frac{\nabla x}{4\pi} \int_{-\infty}^{z_{cr1}} \int_0^{2\pi} \int_0^{\rho_0} \frac{\mu J \rho_1 d\rho_1 d\varphi_1 dz_1}{[\rho_1^2 - 2\rho_s \rho_1 \cos \varphi_1 + \rho_s^2 + (z_s - z_1)^2]^{1/2}}$$

line 13, "$J$" should read —$J$—.

Column 12, Equation (31), should appear as shown below:

$$\frac{\sigma}{\Phi_\Sigma} = \frac{2(y_\Sigma^2 + z_\Sigma^2)^{1/2}}{\mu\omega y_\Sigma^3 \Phi_C [1 + z_\Sigma^2/(y_\Sigma^2 + z_\Sigma^2)]} = \frac{3\sqrt{6}}{4\mu\omega y_\Sigma^2 \Phi}$$

line 10, change "$\sigma/\Phi_\Sigma$) theo = 221 and 610 mhos./m./mv." to —$\sigma/\Phi_\Sigma)_{\text{theo}} = 221$ and 610 mhos./m./mv.—; Equation (32), should appear as shown below:

$$U_{||} = (\Phi_Y/\Phi_\Sigma)(r_\Sigma^2 n_\Sigma / r_Y^2 n_Y)(\sqrt{2}\ 4\omega y_Y^2/3\sqrt{3} y_\Sigma)$$

same column 12, line 26, "$y\Sigma = y_Y$" should read —$y_\Sigma = y_Y$—.

Column 13, line 54, Claim 1, "[$r^2 = 3_z^2$]$r^2 = 3z^2$ should read —$r^2 = 3z^2$—.

Signed and sealed this 23rd day of March 1971.

[SEAL]

Attest:
EDWARD M. FLETCHER, JR.
*Attesting Officer.*

WILLIAM E. SCHUYLER, JR.
*Commissioner of Patents.*